United States Patent
Park et al.

(10) Patent No.: US 9,294,169 B2
(45) Date of Patent: Mar. 22, 2016

(54) WIRELESS COMMUNICATION SYSTEM FOR HIGH-SPEED MOVING OBJECT THAT MOVES ALONG FIXED ROUTE

(71) Applicant: LG ELECTRONICS INC., Seoul (KR)

(72) Inventors: Sungho Park, Anyang-si (KR); Kyujin Park, Anyang-si (KR); Jiwoong Jang, Anyang-si (KR); Hangyu Cho, Anyang-si (KR); Jiwon Kang, Anyang-si (KR); Dongcheol Kim, Anyang-si (KR); Dongguk Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/407,417

(22) PCT Filed: Jun. 17, 2013

(86) PCT No.: PCT/KR2013/005312
§ 371 (c)(1),
(2) Date: Dec. 11, 2014

(87) PCT Pub. No.: WO2013/187743
PCT Pub. Date: Dec. 19, 2013

(65) Prior Publication Data
US 2015/0124895 A1     May 7, 2015

Related U.S. Application Data

(60) Provisional application No. 61/659,980, filed on Jun. 15, 2012.

(51) Int. Cl.
| | |
|---|---|
| *H04K 1/10* | (2006.01) |
| *H04B 7/04* | (2006.01) |
| *H04B 7/06* | (2006.01) |
| *H04L 27/26* | (2006.01) |
| *H04W 24/10* | (2009.01) |

(52) U.S. Cl.
CPC ............ *H04B 7/0417* (2013.01); *H04B 7/0626* (2013.01); *H04B 7/0632* (2013.01); *H04L 27/2626* (2013.01); *H04L 27/2647* (2013.01); *H04W 24/10* (2013.01)

(58) Field of Classification Search
CPC .......... H04L 27/2626; H04L 27/2647; H04W 88/02; H04W 8/08; H04B 7/0626
USPC ................. 375/260, 262, 265, 267, 295, 316; 370/203, 204, 252, 329, 338, 332
See application file for complete search history.

(56) References Cited

U.S. PATENT DOCUMENTS

| | | |
|---|---|---|
| 2004/0017310 A1 | 1/2004 | Vargas-Hurlston et al. |
| 2010/0029263 A1 | 2/2010 | Senoo et al. |

(Continued)

FOREIGN PATENT DOCUMENTS

| | | |
|---|---|---|
| JP | 2010-41101 A | 2/2010 |
| JP | 2011-61437 A | 3/2011 |

(Continued)

*Primary Examiner* — Dhaval Patel
(74) *Attorney, Agent, or Firm* — Birch, Stewart, Kolasch & Birch, LLP (57) ABSTRACT

The present invention relates to a method in which a signal is transmitted between a base station and a terminal in a multi-antenna wireless communication system. The method transmits pre-estimated channel information to the terminal when the terminal moves to a specific position when channel estimation for a specific position is performed. As for the terminal which moves along a fixed route or the route of which can be estimated, the position of the terminal in the near future can be easily detected. Therefore, the transception of channel information can be performed in a more efficient manner in consideration of the above-described special environment.

14 Claims, 9 Drawing Sheets

(56) References Cited

U.S. PATENT DOCUMENTS

| | | |
|---|---|---|
| 2010/0167756 A1* | 7/2010 | Park et al. .................. 455/456.1 |
| 2010/0323715 A1 | 12/2010 | Winters |
| 2011/0124334 A1* | 5/2011 | Brisebois et al. ............. 455/434 |
| 2012/0129528 A1* | 5/2012 | Kobayashi .................. 455/436 |
| 2012/0184317 A1 | 7/2012 | Ihm et al. |
| 2013/0021960 A1 | 1/2013 | Lee et al. |
| 2013/0189990 A1 | 7/2013 | Kim et al. |

FOREIGN PATENT DOCUMENTS

| | | | |
|---|---|---|---|
| JP | 2012-114854 A | 6/2012 | |
| KR | 10-2010-0083088 A | 7/2010 | |
| KR | 10-2011-0040663 A | 4/2011 | |
| KR | 10-2011-0110710 A | 10/2011 | |
| KR | WO2011122813 * | 10/2011 | ............ H04W 52/00 |
| WO | WO 2010/024578 A2 | 3/2010 | |
| WO | WO 2011/152572 A1 | 12/2011 | |
| WO | WO 2011/162509 A2 | 12/2011 | |

* cited by examiner

WIRELESS COMMUNICATION SYSTEM FOR HIGH-SPEED MOVING OBJECT THAT MOVES ALONG FIXED ROUTE

CROSS REFERENCE TO RELATED APPLICATIONS

This application is the National Phase of PCT. International Application No. PCT/KR2013/005312, filed on Jun. 17, 2013, which claims priority under 35 U.S.C. 119(e) to U.S. Provisional Application No. 61/659,980, filed on Jun. 15, 2012, all of which are hereby expressly incorporated by reference into the present application.

TECHNICAL FIELD

The present invention relates to a wireless communication system, and more particularly, to a wireless communication system for a high-speed object moving on a fixed path.

BACKGROUND ART

Currently, in preparation for a mobile traffic explosion which may not be solved by third-generation and fourth-generation mobile communication capacities, fifth-generation mobile communication technology needs to be developed. Fifth-generation mobile communication provides high capacity using a wider frequency band in order to provide improved performance and capacity as compared to a conventional mobile communication scheme and provides an optimal structure for communication between a base station and a user equipment (UE) in consideration of available frequency band. In addition, coverage can be supplemented and enlarged using heterogeneous network technology composed of a macro-cell and a small-cell and data processing capacity and speed can be increased using multiple bands.

In order to control increased data traffic, device-to-device (D2D) technology for performing direct communication between devices without via a network or machine-to-machine (M2M)/Internet of Things (IoT) technology for connecting peripheral things via a network to deliver or obtain necessary information at anytime and anywhere have become important.

Fifth-generation mobile communication provides high capacity using a wider frequency band in order to provide improved performance and capacity as compared to a conventional mobile communication scheme and provides a communication structure between a base station and a user equipment (UE) in consideration of available frequency band.

It is possible to enlarge coverage and increase data capacity using heterogeneous network technology, to reduce network traffic using D2D technology and to improve service quality using M2M technology.

A 4G cellular communication system which is currently being discussed is designed based on one basic frame and is designed to provide optimized performance to a user who moves at a low speed. Such a system is designed to support a user who moves at a speed of 350 km/h, but the performance thereof is inferior to that of a user who moves at a low speed. If such a cellular communication system is applied to a high-speed train, link quality between a network and the high-speed train is deteriorated and sufficient link capacity cannot be ensured due to high mobility of 350 km/h. If the speed of the high-speed train will exceed 500 km/h in the future due to technological development, performance deterioration will become more serious and quality of a wireless data service provided to a passenger will be significantly decreased. If a scenario in which a high-speed train uses some capacity of a macro base station (BS) is used, data communication of other users in a cell may be deteriorated.

Accordingly, instead of wireless communication, wired communication may be used for communication between a network and a high-speed train. For example, communication between a high-speed train and a network may be performed through an AC signal using a railroad, with which the high-speed train is in contact. However, in such a system, capacity of the railroad is low and it is difficult to establish more links due to physical restriction that the number of simultaneously connected railroads is restricted to two. Similarly, a power line communication (PLC) method of performing communication using a power line may be used. However, this method has the same disadvantages as the communication method using the railroad and cannot be disadvantageously applied to a train without a power line.

A conventional mobile terminal is portable and compact, but has relatively low performance. However, as digital communication apparatuses have been increasingly used and services have been diversified, demand for seamless high-speed data transmission at anytime and anywhere has increased. Thus, demand for high-speed data transmission in high-speed moving objects such as cars, trains or aircrafts has increased.

A conventional cellular system was designed to operate at the movement speed (e.g., 120 km/h) of a general vehicle, but was mainly optimized for a low-speed mobile terminal, such that a data transfer rate is low and network connection is barely maintained at a predetermined speed or more. In addition, since the conventional cellular system is designed in consideration of high frequency selectivity, pilot overhead is significantly high. If such a system is applied to a very high speed (e.g., 350 km/h or more) of a high-speed train without change, quality of a link between a network and the high-speed train may deteriorate. As a problem of the conventional communication technology, an open-loop transmission and reception scheme should be applied to a high-speed mobile terminal. While a closed-loop transmission and reception scheme is far superior to an open-loop transmission and reception scheme in terms of performance in a low-speed environment, the open-loop transmission and reception scheme is far superior to the closed-loop transmission and reception scheme in terms of performance in a high-speed environment. The closed-loop transmission and reception scheme is based on accurate channel estimation according to the position of a UE. However, at a high speed, channel estimation is difficult due to Doppler shift according to the speed and overhead for channel information feedback rapidly increases due to a time-variant channel property. Accordingly, in a high-speed environment, better performance can be obtained by improving spatial diversity via an open-loop transmission and reception scheme which does not require channel estimation except for link quality (or channel quality) estimation for determining a modulation/demodulation level.

The present invention proposes a channel estimation scheme for guaranteeing high-speed data transmission in such a communication environment and a fixed route prediction based transmission and reception scheme for simplifying a related process and efficiently reducing resources.

The present invention proposes a route prediction based transmission and reception scheme for remarkably reducing channel estimation overhead and feedback overhead as compared to a conventional closed-loop transmission and reception scheme even in a high-speed environment via channel estimation based on route prediction of a UE which moves on a fixed or predictable route, such as a vehicle or a train, and obtaining performance similar to that of the closed-loop transmission and reception scheme at a low speed.

DISCLOSURE

Technical Problem

An object of the present invention is to provide a communication system for a high-speed object moving on a fixed path.

The technical problems solved by the present invention are not limited to the above technical problems and other technical problems which are not described herein will become apparent to those skilled in the art from the following description.

Technical Solution

The object of the present invention can be achieved by providing a method of transmitting a signal from a base station to a user equipment (UE) in a multi-input multi-output (MIMO) wireless communication system including determining a transmission and reception scheme of the UE based on channel information previously measured at a specific position from a first UE, checking whether a second UE moves to the specific position, and transmitting, to the second UE moving to the specific position, one or more of the transmission and reception scheme determined at the specific position or the channel information previously measured at the specific position, when the second UE moves to the specific position.

The channel information may be applied to the UE moving on a fixed route.

The channel information may include at least one or more of received signal strength indicator (RSSI), received signal received quality (RSRQ), received signal received power (RSRP), channel quality indicator (CQI), precoding vector index (PVI), precoding matrix indicator (PMI) and rank indicator (RI) information.

The channel information may be divided and stored according to an antenna configuration of the UE.

The channel information may be divided and stored according to a movement speed of the UE.

The channel information may be divided and stored according to a weather condition of the specific position.

The channel information may be stored in a database of the base station, and the channel information stored in the database may be updated at a predetermined time interval.

The determining the transmission and reception scheme may include determining a modulation type according to a movement speed of the UE.

The checking whether the second UE moves to the specific position may include computing and checking a position, movement direction and movement speed of the second UE.

The first UE and the second UE may be the same.

In another aspect of the present invention, provided herein is a method of receiving a signal at a user equipment (UE) in a multi-input multi-output (MIMO) wireless communication system including receiving channel information related to a specific position from a base station, performing channel estimation at the specific position and determining a transmission and reception scheme at the specific position based on the received channel information and a result of performing channel estimation.

The method may further include comparing the received channel information and channel estimation information and feeding the channel estimation information of the UE back to the base station if a difference between the received channel information and the channel estimation information is outside a predetermined error range.

The method may further include comparing the received channel information and channel estimation information and feeding information indicating that the received channel information is valid back to the base station if a difference between the received channel information and the channel estimation information is within a predetermined error range.

In another aspect of the present invention, provided herein is a base station apparatus in a multi-input multi-output wireless communication system including a processor, a receiver configured to receive movement information of a first UE and a transmitter configured to transmit, to the first UE moving to a specific position, one or more of a transmission and reception scheme determined at a specific position and channel information previously measured at the specific position, if the first UE moves to the specific position, wherein the processor determines whether the first UE moves to the specific position and determines a transmission and reception scheme of the UE based on the channel information previously measured at the specific position from a second UE.

Advantageous Effects

According to a communication system of the present invention, it is possible to significantly improve communication efficiency and performance of users in an object moving at a very high speed.

According to the present invention, a user equipment (UE) and a base station can obtain performance similar to that of a closed-loop transmission and reception scheme via an open-loop transmission and reception scheme in a high-speed moving object by using pre-stored channel information. In addition, it is possible to reduce computation overhead for channel estimation of the UE and the base station and to reduce channel status information (CSI) feedback overhead of the UE.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Configuration of Communication System

Figure 1:
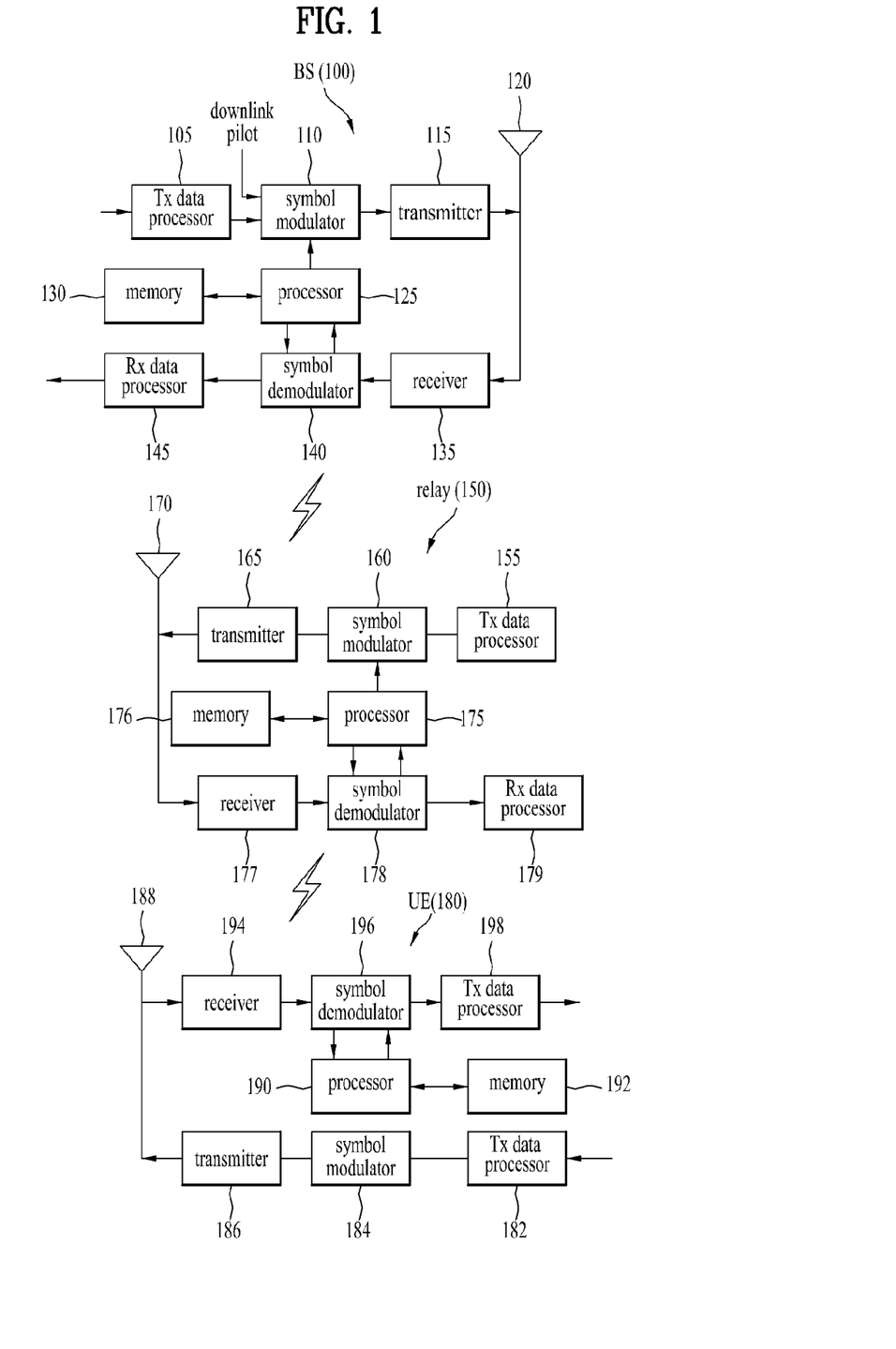
FIG. 1 is a block diagram showing the configuration of a communication system according to the present invention.

FIG. 1 is a block diagram showing the configuration of a communication system according to the present invention.

The communication system according to the present invention includes a base station (BS) 100, a relay 150, a user equipment (UE) 180 and a network (not shown). Although one BS, one relay 200 and one UE 300 are shown for simplicity of the communication system, the wireless communication system according to the present invention may include a plurality of BSs, relays and UEs.

Referring to FIG. 1, the BS 100 may include a transmission (Tx) data processor 105, a symbol modulator 110, a transmitter 115, a Tx/Rx antenna 120, a processor 125, a memory 130, a receiver 135, a symbol demodulator 140 and a reception (Rx) data processor 145. The relay 150 may include a Tx data processor 155, a symbol modulator 160, a transmitter 165, a Tx/Rx antenna 170, a processor 175, a memory 176, a receiver 177, a symbol demodulator 178 and an Rx data processor 179. The UE 180 may include a Tx data processor 182, a symbol modulator 184, a transmitter 186, a Tx/Rx antenna 188, a processor 190, a memory 192, a receiver 194, a symbol demodulator 196 and an Rx data processor 198.

Although one antenna 120, one antenna 170 and one antenna 188 are respectively shown as being included in the BS 100, the relay 150 and the UE 180, each of the BS 100, the relay 150 and the UE 180 may include a plurality of antennas. Accordingly, the BS 100, the relay 150 and the UE 180 according to the present invention support a multiple input multiple output (MIMO) system. The BS 100, the relay 150 and the UE 180 according to the present invention may support both a single user (SU)-MIMO scheme and a multi user (MU)-MIMO scheme.

In downlink, the Tx data processor 105 of the BS 100 receives traffic data, formats and codes the received traffic data, interleaves and modulates (or symbol-maps) the coded traffic data, and provides modulated symbols ("data symbols"). The symbol modulator 110 receives and processes the data symbols and pilot symbols and provides a stream of the symbols.

The symbol modulator 110 of the BS 100 multiplexes data and pilot symbols and transmits the multiplexed data and pilot symbols to the transmitter 115. At this time, each transmitted symbol may include a data symbol, a pilot symbol, or a zero signal value. The pilot symbols may be contiguously transmitted in symbol periods. The pilot symbols may include frequency division multiplexing (FDM) symbols, orthogonal frequency division multiplexing (OFDM) symbols, time division multiplexing (TDM) symbols or code division multiplexing (CDM) symbols.

The transmitter 115 of the BS 100 receives the stream of the symbols, converts the stream to one or more analog signals, and additionally adjusts (e.g., amplifies, filters and frequency up-converts) the analog signals, thereby generating a downlink signal suitable for transmission through a radio channel. Subsequently, the downlink signal is transmitted to a UE through the antenna 120.

The reception antenna 170 of the relay 150 may receive a downlink signal from the BS 100. The processor 175 of the relay 150 may demodulate the downlink signal received from the BS 100 and transmit the demodulated downlink signal to the UE 110 through the transmission antenna 170. In addition, the reception antenna 170 of the relay 150 may receive an uplink signal from the UE 110. The processor 175 of the relay 150 may demodulate the uplink signal received from the UE and transmit the demodulated uplink signal to the BS 100.

In the UE 180, the antenna 188 receives a downlink signal from the BS 100 or the relay 150 and provides the received signal to the receiver 194. The receiver 194 adjusts (for example, filters, amplifies, and frequency down-converts) the received signal, digitalizes the adjusted signal, and acquires samples. The symbol demodulator 198 demodulates the received pilot symbols and provides the demodulated pilot signals to the processor 190, for channel estimation.

The symbol demodulator 196 receives a frequency response estimation value for downlink from the processor 190, performs data demodulation with respect to the received data symbols, acquires data symbol estimation values (which are estimation values of the transmitted data symbols), and provides the data symbol estimation values to the Rx data processor 198. The Rx data processor 150 demodulates (that is, symbol-demaps), deinterleaves and decodes the data symbol estimation values and restores the transmitted traffic data.

The processes by the symbol demodulator 196 and the Rx data processor 198 are complementary to the processes by the symbol modulator 110 and the Tx data processor 105 of the BS 100.

In the UE 180, the Tx data processor 182 processes traffic data and provides data symbols in uplink. The symbol modulator 184 receives the data symbols, multiplexes the data symbols with pilot symbols, performs modulation, and provides a stream of symbols to the transmitter 186. The transmitter 186 receives and processes the stream of symbols, generates an uplink signal, and transmits the uplink signal to the BS 100 or the relay 150 through the antenna 135.

In the BS 100, the uplink signal is received from the UE 100 through the antenna 130. The receiver 190 processes the received uplink signal and acquires samples. Subsequently, the symbol demodulator 195 processes the samples and provides pilot symbols and data symbol estimation values received in uplink. The Rx data processor 197 processes the data symbol estimation values and restores the traffic data transmitted from the UE 180.

As described above, the UE and the BS have respective modules and communicate with each other via several operations. In the present invention, an efficient method for transmitting and receiving channel status information between the UE and the BS during communication will be described. First, the channel status information and a method of acquiring the channel status information will be described.

Acquisition of Channel Status Information—Downlink/Uplink Scheduling

In order to select an appropriate data rate between the UE and the BS, that is, in order to select an appropriate modulation scheme and channel coding rate, a transmitter should know information about a radio link channel status. Such information is also necessary for scheduling according to channels. In an FDD based system, only a receiver can accurately estimate a radio link channel status.

In principle, the transmitter requires an estimate of a channel status upon transmission. Accordingly, the UE may predict a future channel status using a prediction apparatus and report the predicted value to the BS. However, in this method, since a detailed prediction algorithm and how the prediction algorithm operates according to the movement speeds of different UEs need to be known, most of the systems report measured channel statuses to the BS only. In this case, in the prediction apparatus, the future channel status may be regarded as being similar to the current channel status. Accordingly, link adaptation efficiency may deteriorate as the channel status is rapidly changed in the time domain.

For downlink scheduling operation, the UE may provide a network with a channel status report indicating instantaneous downlink channel quality in the time and frequency domains. For example, the channel status can be obtained by measuring a reference signal transmitted on downlink. This reference signal may be used to demodulate a received signal. Based on the channel status report, a downlink scheduler may assign resources for downlink transmission to different UEs while considering channel quality in a scheduling decision. In principle, the UE may be assigned resources in an arbitrary combination of resource blocks having a frequency bandwidth of 180 kHz at a scheduling gap of 1 ms.

Uplink of LTE is based on a method for orthogonally dividing different uplink transmissions. An uplink scheduler is responsible for assigning resources to different UEs in the time and frequency domains (in a combination of TDMA and FDMA). A scheduler decides which UE performs transmission per ms in a cell during a predetermined time duration, decides which frequency resources are used for transmission to each UE and how uplink data rate (transport format) is selected.

In order to aid the network in selecting an appropriate precoding matrix used for transmission, the UE may report the number of layers (RI) as well as a desired precoding matrix (PMI) based on estimation of a downlink channel status. The network may or may not use a value recommended by the UE when performing transmission to the UE.

Open-loop spatial multiplexing does not depend on the recommendation for a desired precoding matrix of the UE and precoding information is not explicitly signaled from the network to the UE. Accordingly, open-loop spatial multiplexing is suitable for the case in which additional overhead of uplink necessary for closed-loop spatial multiplexing and a high-mobility environment is not allowed.

As described above, the UE provides the channel status report to the network in order to aid in scheduling according to a downlink channel and the network decides scheduling based on the channel status report.

The channel status report is the recommendation of transmission settings and related parameters which are to be used upon transmission to the UE. The recommendation of the UE is generally based on an instantaneous downlink channel status and thus is referred to as a channel status report.

The channel status report may include one or more of the following:

Rank indicator (RI): This indicator provides information about a recommendation value for rank used for transmission, that is, the number of layers which are to be used for downlink transmission to the UE. The RI needs to be transmitted only when one of spatial multiplexing modes is set. Only one RI is reported over an entire bandwidth. That is, the RI is non-selective on the frequency axis. In LTE, since all layers are transmitted using the same resource block set, other transmission ranks are impossible on the frequency axis.

Precoding matrix indicator (PMI): This indicator indicates a precoding matrix which is to be used for downlink transmission. The reported precoding matrix is determined based on the number of layers indicated by the RI. The recommendation for the precoding matrix may be frequency-selective. That is, the UE may recommend different precoding matrices with respect to different parts of the downlink spectrum. In addition, the network may impose a restriction on precoding matrices recommended by the UE. This is referred to as codebook subset restriction. This restriction is imposed in order to avoid the report for a precoding matrix which does not aid in antenna configuration.

Channel quality indicator (CQI): This indicator means a highest modulation and coding scheme (MCS) for PDSCH transmission which may be received at a block error rate (BLER) of 10% or less based on the recommended RI and PMI. The reason why a signal-to-interference-plus-noise ratio (SINR) is not used but CQI is used as feedback information is because receivers implemented in different UEs are considered. In addition, it is possible to simplify tests for the UE if the SINR is not used but CQI is used for feedback. That is, if the BLER exceeds 10% in the MCS indicated by the CQI of the UE, this means that the UE does not pass the test.

A combination of the RI, the PMI and the CQI configures a channel status report. Information included in the channel status report may be changed according to the transmission mode set by the UE.

The procedure of acquiring the channel status information is preferably performed per transmission environment. However, the operation of the UE may be burdened. In order to reduce such a burden, there is a need for a method of acquiring channel status information when a UE moves on a fixed route or when a movement route of a UE is predicted. Hereinafter, a method of acquiring channel information of a UE moving on a fixed route will be described.

Special Environment of a UE Moving on a Fixed Route

Figure 2:
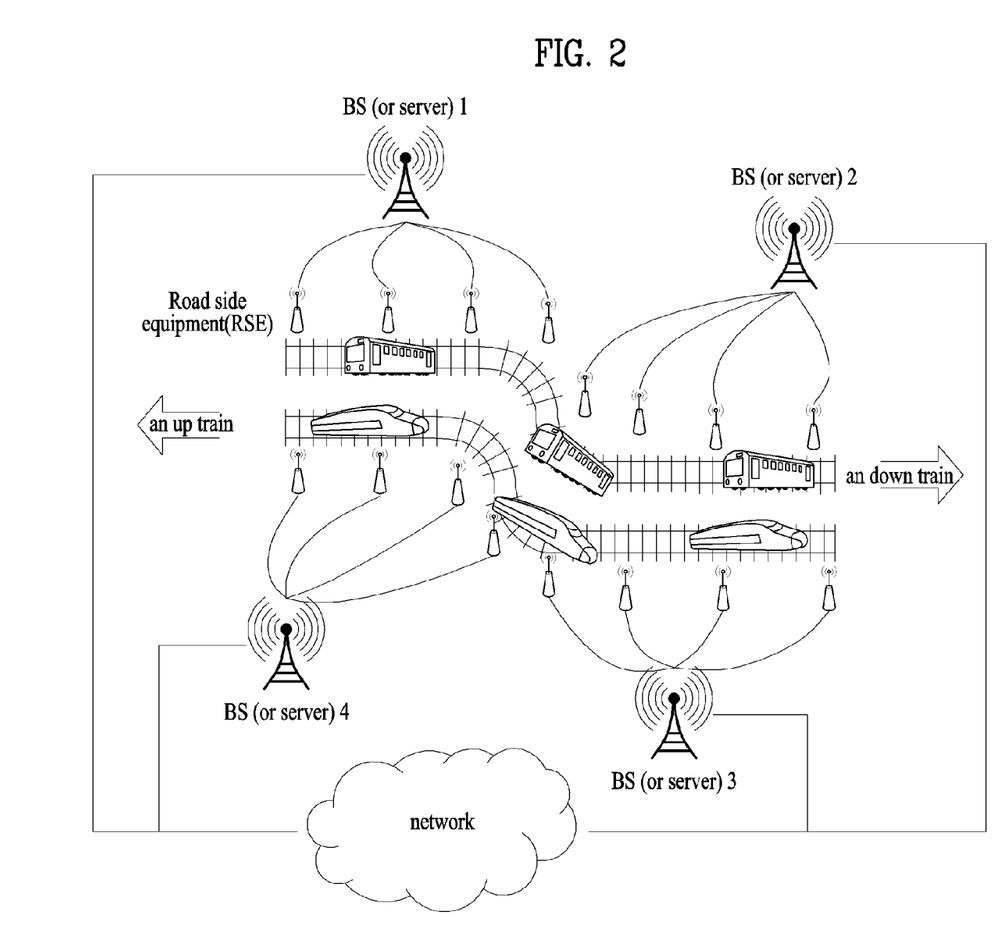
FIG. 2 is a diagram showing an example of a fixed route environment assumed in the present invention.

FIG. 2 is a diagram showing an example of a fixed route environment assumed in the present invention.

As shown in FIG. 2, a train moves on a fixed track. An up train moves while receiving a signal of a BS (or server) 2 and then receiving a signal of a BS (or server) 1. A down train moves while receiving a signal of a BS (or server) 4 and then receiving a signal of a BS (or server) 3. Each BS may communicate with a roadside equipment and the roadside equipment may communicate with the train.

In the present invention, assume that a roadside equipment provides a service to a UE moving on a fixed route or a predictable route. Examples of the fixed route may include a train track. Such route environments are characterized as follows.

1) The route is likely to be fixed, except in special cases.

The train may move along a track and movement of the train on a predetermined track may be predicted because the track is not easily changed. A vehicle may move on a roadway and a path which is not a roadway is likely to be an environment which is not suitable for movement of the vehicle (unpaved road, the width of the road, etc.).

2) Speed change of a UE on a route is likely to be fixed at a specific point and/or a specific time, except in special cases.

On a straight-line route, the vehicle is predicted to move at a predetermined speed if there is no special restriction (e.g., stop signal). On a curved route, the vehicle is predicted to move at a speed less than that of the straight-line path in order to prevent shaking due to force (centrifugal force, centripetal force, etc.). Accordingly, speed change may be predicted according to the property of the route.

3) The peripheral environment of the UE may be fixed or predictable at a specific point and/or a specific time.

Even a UE which moves in a time-variant environment has a fixed condition for a peripheral environment at a specific position. When the UE passes through a tunnel or crosses a bridge, the moving UE may be influenced. Transmission and reception sensitivity of the UE may be decreased when the UE passes through a tunnel but transmission and reception sensitivity of the UE may be increased when the UE crosses a bridge.

Another example of a predictable route includes a general roadway.

Figure 3:
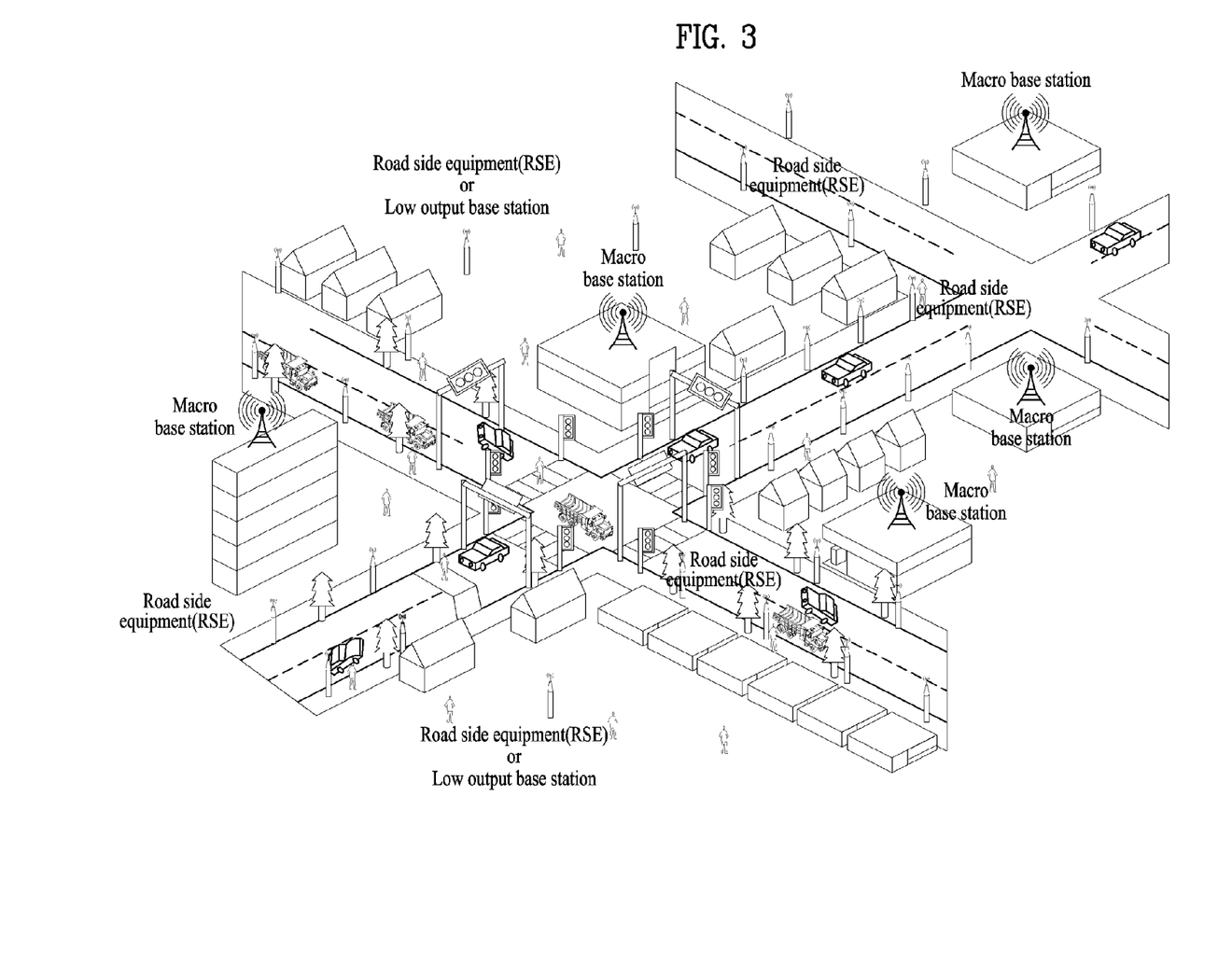
FIG. 3 is a diagram showing communication of a moving vehicle on a general roadway via a roadside equipment and a roadside macro base station.

FIG. 3 is a diagram showing communication of a moving vehicle on a general roadway via a roadside equipment and a roadside macro base station.

Such a roadway has the following features.

1) The number of routes selected by a user is restricted.

Referring to FIG. 3, if the vehicle is located at a four-way intersection, the direction of the vehicle is restricted to straight, left turn, right turn and U-turn. The vehicle may move in three directions in a three-way intersection and move in five directions in a five-way intersection.

2) Speed change of the vehicle moving on the roadway is larger than that of the train moving on the train track and the speed of the vehicle is relatively low.

Since the weight of the vehicle is less than that of the train, acceleration and deceleration of the vehicle are easier than that of the train. Accordingly, during a short time, the speed change of the vehicle moving on the roadway is larger than that of the train moving on the track. In addition, since the vehicle repeatedly moves and stops during movement due to a stop signal, the speed of the vehicle may be lower than that of the train.

3) The peripheral environment of the UE is extremely changed. For example, even when the UE stops, the Doppler spectrum due to mobility of peripheral UEs is about 2 Hz.

The environment may be changed according to the property of the roadway. If the road is wide (e.g., 10-lane road), the vehicle may move more rapidly as compared to on a narrow road. The speed of the vehicle may be changed according to the speed of the vehicle moving in the opposite direction.

However, in the present invention, for convenience of description, assume that the UE moving on the train track, that is, the train, communicates with the roadside equipment.

As shown in FIG. 3, the roadside equipment assumed in the present invention may be a roadside BS arranged on the roadside at a predetermined interval or a general macro BS arranged on the roadside. The roadside equipment may be a general BS (e.g., including a cellular BS, an access point (AP), etc.), a remote radio unit or a distributed antenna unit. One or more antennas may be mounted and an antenna polarization property may be co-polarization or cross-polarization. In addition, assume that the antenna of the roadside equipment is sufficiently tilted on a general roadway or track to minimize interference with the opposite-direction lane or track.

In addition, although the UE assumed in the present invention does not exclude a general UE (e.g., a smartphone, a tablet, a laptop, etc.), a UE which is mounted in the vehicle or train and in which antennas are mounted with less space restriction is assumed.

Figure 4:
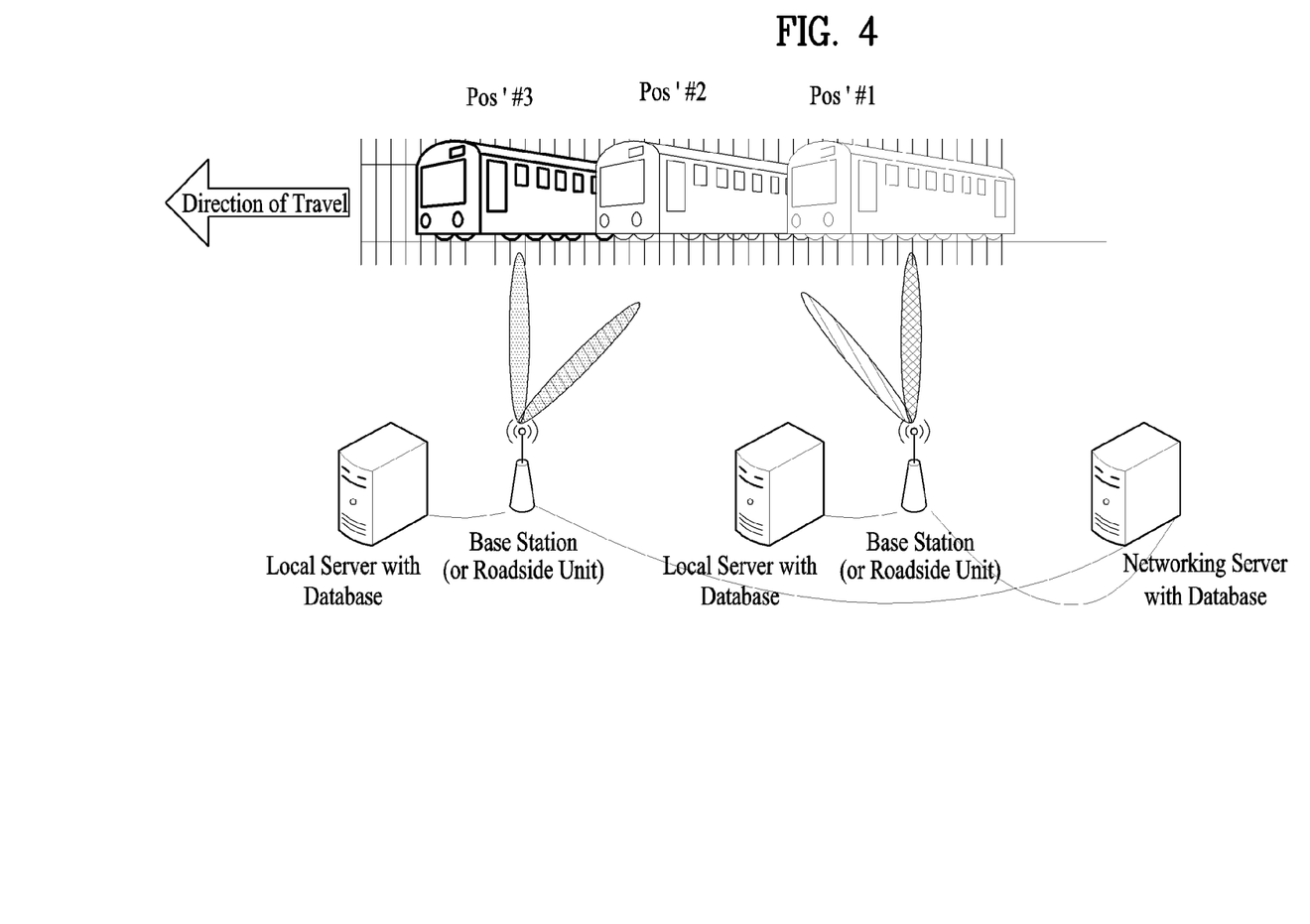
FIG. 4 is a diagram showing an example of a roadside equipment communicating with a user equipment (UE) moving along a fixed route using pre-stored channel information in a communication system according to an embodiment of the present invention.

FIG. 4 is a diagram showing an example of a roadside equipment communicating with a UE moving along a fixed route using pre-stored channel information.

As shown in FIG. 4, the train communicates with a BS or a roadside equipment at a first position (Pos' #1). Thereafter, the train moves to a third position (Pos' #3) through a second position (Pos' #2) and communicates with another BS different from the BS located at the first position. At this time, the BSs communicating with the train have databases in local servers or in a networking server.

In an environment having a fixed or predictable route, a channel environment (or variable) of a BS and a specific point may be fixed, predictable or controllable. For example, in a train having a fixed destination, a movement route may be substantially fixed or restrictively changed. The departure and arrival times of the train are constant except under special circumstances. Accordingly, in the present invention, such a special channel environment is used.

Embodiment 1

Transmission of Channel Information at a Specific Position

<Detection of Position of Moving UE>

The UE moves on a fixed route or a predictable route. Accordingly, as compared to a method of detecting the position of a general UE, it is possible easily detect the position of the UE.

A BS can detect the current position of the UE. The BS can detect the current position of the UE based on a signal transmitted from the UE to the BS or a signal transmitted from a satellite. Alternatively, it is possible to detect the position of the UE using an external measurement apparatus (a barometer, a global positioning system (GPS), a camera, an AP, etc.). Although the position of the UE is detected when the UE transmits the signal, this position may be estimated as the current position of the UE.

Since the route is fixed, the movement direction may be easily determined. If it is determined whether the train is an up train or a down train, it is possible to detect the position of the train. A general vehicle is equal to a train if there is no intersection (three-way intersection, four-way intersection, etc.). However, if there is an intersection, some cases should be considered but the position of the vehicle can be easily detected as compared to the case in which the movement direction of the vehicle is not predicted.

In order to detect the position of the UE, the movement speed of the UE is necessary as a variable. As described above, the speed and the speed change of the vehicle are fixed at a specific position.

Using the current position, the movement direction and the movement speed, it is possible to detect the position of the UE in the near future. Accordingly, the BS may transmit suitable information to the UE in the near future.

<Database Establishment of BS>

The roadside equipment (RSE) should store pre-measured channel information of specific positions (that is, reference positions) in RSE coverage and/or applicable transmission and reception scheme in a local database, a remote database or network database. In addition, the channel information stored in the database may be updated at a predetermined time interval. At this time, the pre-measured channel information includes at least one of received signal strength indicator (RSSI), received signal receive quality (RSRQ), received signal received power (RSRP), channel quality indicator (CQI), precoding vector index (PVI), precoding matrix indicator (PMI) and rank indicator (RI) information.

The channel information stored in the database may be stored according to a predetermined criterion to be suitably and rapidly searched for by the UE.

The channel information stored in the database and used by the BS may be divided and stored according to the antenna configuration of the UE. This is because the channel information required by the UE may be changed depending on the number of antennas or the type of antenna.

The channel information may be divided and stored according to the movement speed of the UE. Since performance is good at a low speed but is bad at a high speed, the channel status may be changed according to the movement speed of the UE. For example, the channel status may be divided and stored according to the high speed, the middle speed and the low speed of the UE.

Additionally, the information may be divided and stored according to the time domain. For example, since traffic changes according to time slot and seasonal variation changes a channel environment, the channel information may be divided and stored according to time slot and seasonal variation. In addition, the information may be divided and stored according to a weather condition. For example, the channel information may be divided and stored according to temperature, humidity, air volume and rainfall/snowfall.

Embodiment 1-1

Transmission of Channel Information and Related Information of a Specific Position to a Moving UE According to one embodiment of the present invention, the roadside equipment transmits a transmission and reception scheme used by the UE and information thereabout using channel information at a corresponding position according to the condition of the UE.

That is, the BS determines a transmission and reception scheme of the UE based on the channel information pre-measured at a specific position from a first UE and checks whether a second UE moves to the specific position. When the second UE moves to the specific position, one or more of the transmission and reception schemes determined at the specific position or the channel information pre-measured at the specific position is transmitted to the second UE moving to the specific position.

Information sent from the BS to the second UE may be the channel information stored in the database or a transmission and reception scheme and related information using the same. For example, the channel information may include a modulation and coding scheme (MCS) at the specific position, the PMI, the RI, the transmission mode. The UE (first UE) for measuring the channel information stored in the database and the UE (second UE) for receiving the information from the BS may be the same. That is, when the UE (first UE) measures the channel information at a previous time and then moves to the specific position again, the UE may receive the channel information measured thereby from the BS. The information corresponding to the condition of the UE is at least one of the following:

A. Current position at the BS report time

B. Predicted position when the UE uses the channel information

C. Movement speed or movement direction of the UE

D. Antenna configuration of the UE (the number of antennas, antenna type, etc.)

E. Current date and time

F. Weather information at a reference point near the UE or peripheral places thereof G. Traffic information at a reference point near the UE or peripheral places thereof.

In order for the BS to determine the MCS level of the transport block upon transmission, the UE estimates the channel status from a reference signal, a pilot signal or a preamble, etc. and feeds CQI back to the BS. The BS generates a transport block with an MCS level suitable for the channel status upon transmission.

Fundamentally, the transmitter requires an estimate of the channel status upon transmission. Accordingly, the UE may use a prediction apparatus for predicting the future channel status and report the predicted value to the BS using the prediction apparatus. However, in this method, since a detailed prediction algorithm and how the prediction algorithm operates according to movement speeds of different UEs are required, most of the systems report the measured channel statuses to the BS. In this case, in the prediction apparatus, the future channel status may be regarded as being similar to the current channel status.

The second UE may feed information about the movement speed of the UE back to the BS such that the roadside equipment can easily and accurately detect the stored channel information. The information about the movement speed may be information estimated via Doppler shift estimated via a reference signal, a pilot signal, a preamble, etc. or a value measured via an external measurement apparatus (e.g., an inertial sensor, an accelerator, etc.). A coordinate value of a current position obtained via a GPS or a value estimated via a reference signal received via the BS and a value measured via an external apparatus may be reported to the BS.

Embodiment 1-2

Decision of a Transmission and Reception Scheme Using Channel Information at a Specific Position According to another embodiment of the present invention, a UE, which moves on a fixed or predictable route, previously receives channel information of a first UE at a specific point via a roadside equipment for storing channel information of the specific position to determine a transmission and reception scheme.

Unlike the above-described embodiment, the roadside equipment does not directly determine the transmission and reception scheme of the second UE. The roadside equipment transmits the pre-stored channel information suitable for the condition of the UE to the UE before the UE moves to the specific position.

In other words, the second UE receives the channel information of the first UE related to the specific position from the BS and performs channel estimation at the specific position.

Based on the received channel information and the result of directly performing channel estimation, the transmission and reception scheme at the specific position is determined.

The second UE performs channel estimation using a conventional method. Alternatively, channel estimation may be performed using the conventional method and the period thereof may be set to be longer. By setting the period to be longer, it is possible to reduce a burden caused due to channel estimation of the UE.

The second UE compares the channel information estimated thereby with the channel information of the first UE transmitted by the BS and does not feed the channel information back to the BS if a difference between the channel information is within a predetermined range. Alternatively, a signal indicating that the channel information of the first UE transmitted by the BS is valid (is correct or may be used without change) may be fed back.

The second UE compares the channel information estimated thereby with the channel information transmitted by the BS and feeds information indicating that the channel information transmitted by the BS is different from the current channel information back to the BS if a difference between the channel information is outside the predetermined range and updates the channel information to the channel information estimated by the second UE.

Embodiment 2

Reuse of Channel Measurement Information of the Antenna

Embodiment 2-1

Reuse of the Channel Measurement Information of the Front Antenna at the Rear Antenna in the UE Hereinafter, other embodiments of the present invention will be described. In Embodiment 1, the method of applying the channel information measured at the specific position to the near future was described. The below-described embodiment is applicable simultaneously with the above-described embodiment and the method of reusing channel information on the assumption that channel information measured at a previous time is not significantly changed and thus is valid at a current time.

Figure 5:
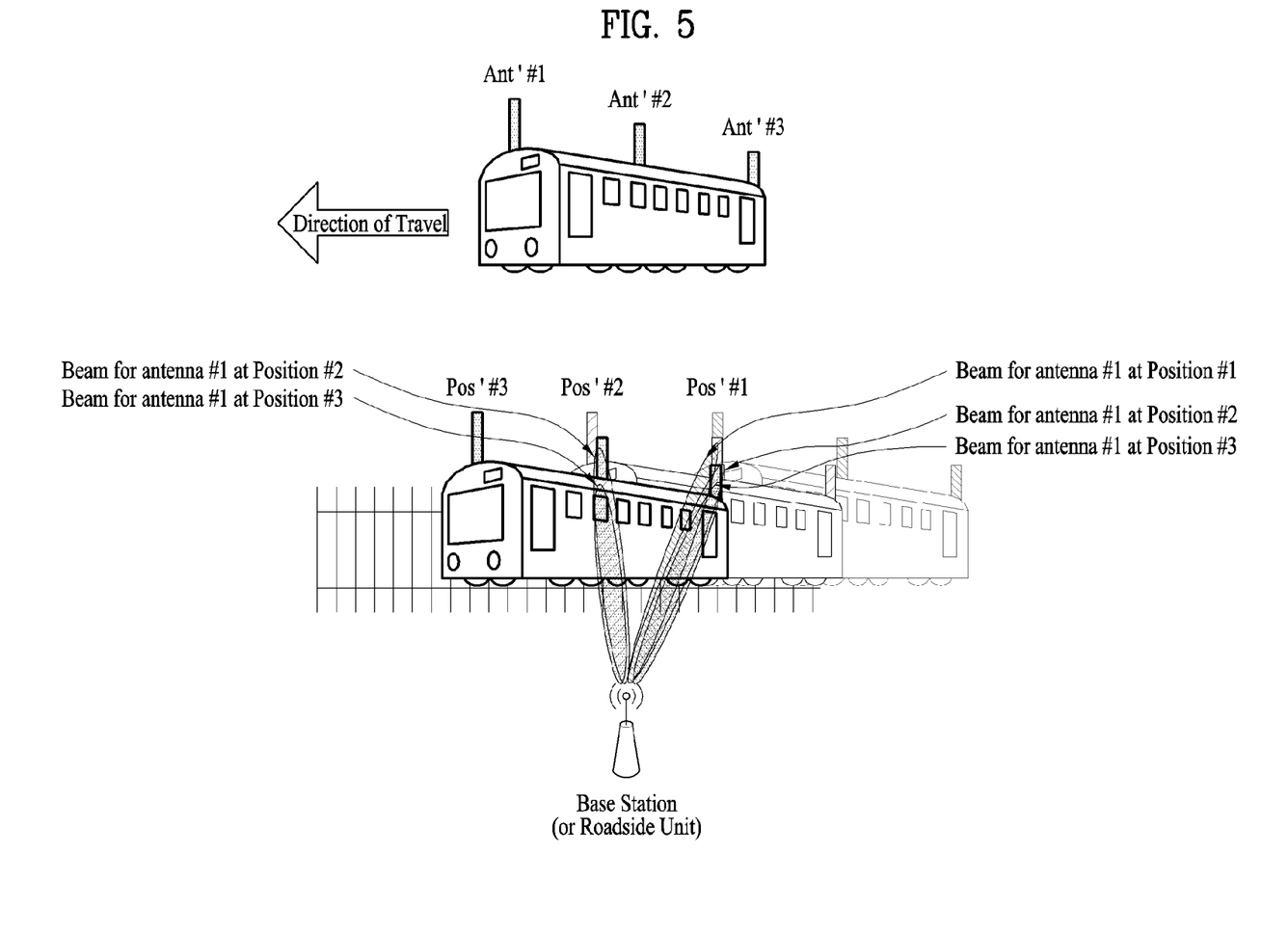
FIG. 5 is a diagram showing an example of applying channel estimation information of a front antenna to a rear antenna.

FIG. 5 is a diagram showing an example of applying channel estimation information of a front antenna to a rear antenna.

A UE includes one or more antennas. Since a UE having a single antenna is not applicable to this embodiment, assume that the UE has a plurality of antennas. If the UE moves on a fixed route and the antennas are arranged in different time domains, that is, the antennas receive the same signal at different times, the channel estimation information obtained by the front antenna is reused in the rear antenna using the time difference.

As shown in FIG. 5, for convenience of description, assume that the UE has three antennas. At this time, the antennas are arranged in the same direction as the travel direction of the train. In this case, channel estimation is performed at a first position (Pos' #1) with respect to a first antenna (Ant' #1) and information obtained by performing channel estimation is reused as channel information of a second antenna (Ant' #2) at a second position (Pos' #2) (that is, the fore part of the train is at the second position) and is reused as channel information of a third antenna (Ant' #3) at a third position (Pos' #3) (that is, the fore part of the train is at the third position), such that the channel information of the second and third positions can be acquired without performing channel estimation with respect to the second antenna and the third antenna at the second position and the third position. As an equal example, channel estimation may be performed with respect to the first antenna at the second position and the information obtained by channel estimation may be reused as channel information of the second antenna at the third position.

Figure 6:
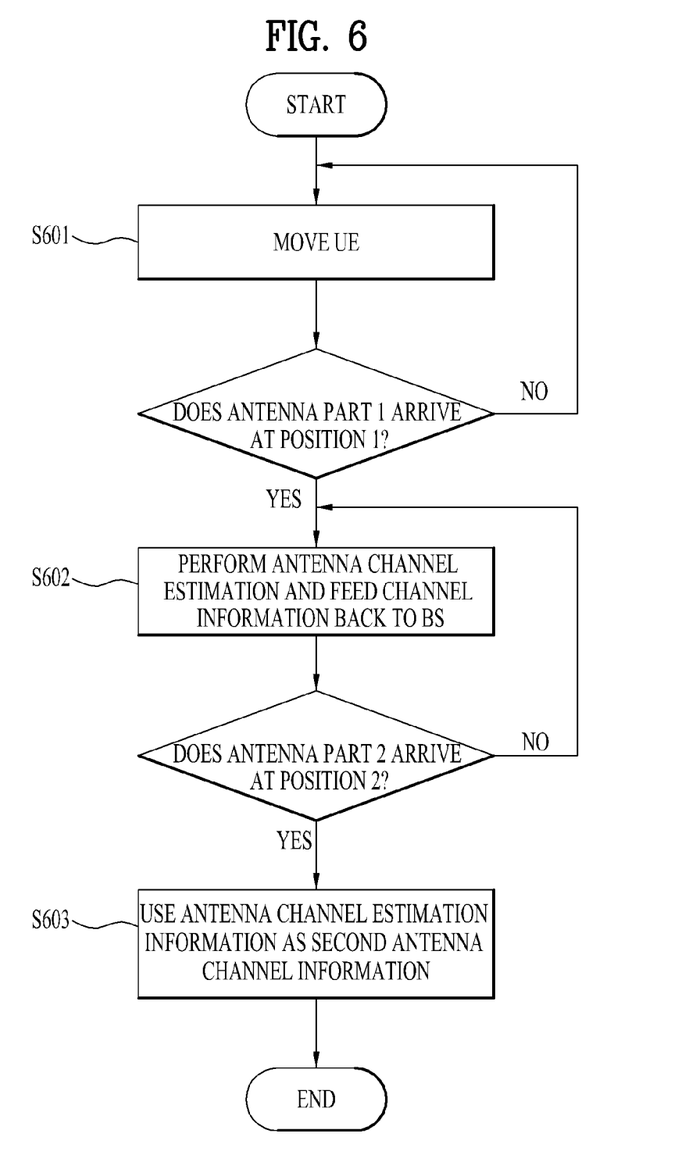
FIG. 6 is a flowchart illustrating a procedure of applying channel estimation information of a front antenna to a rear antenna.

FIG. 6 is a flowchart illustrating a procedure of utilizing channel information estimated by a front antenna of a moving UE in a rear antenna.

Figure 7:
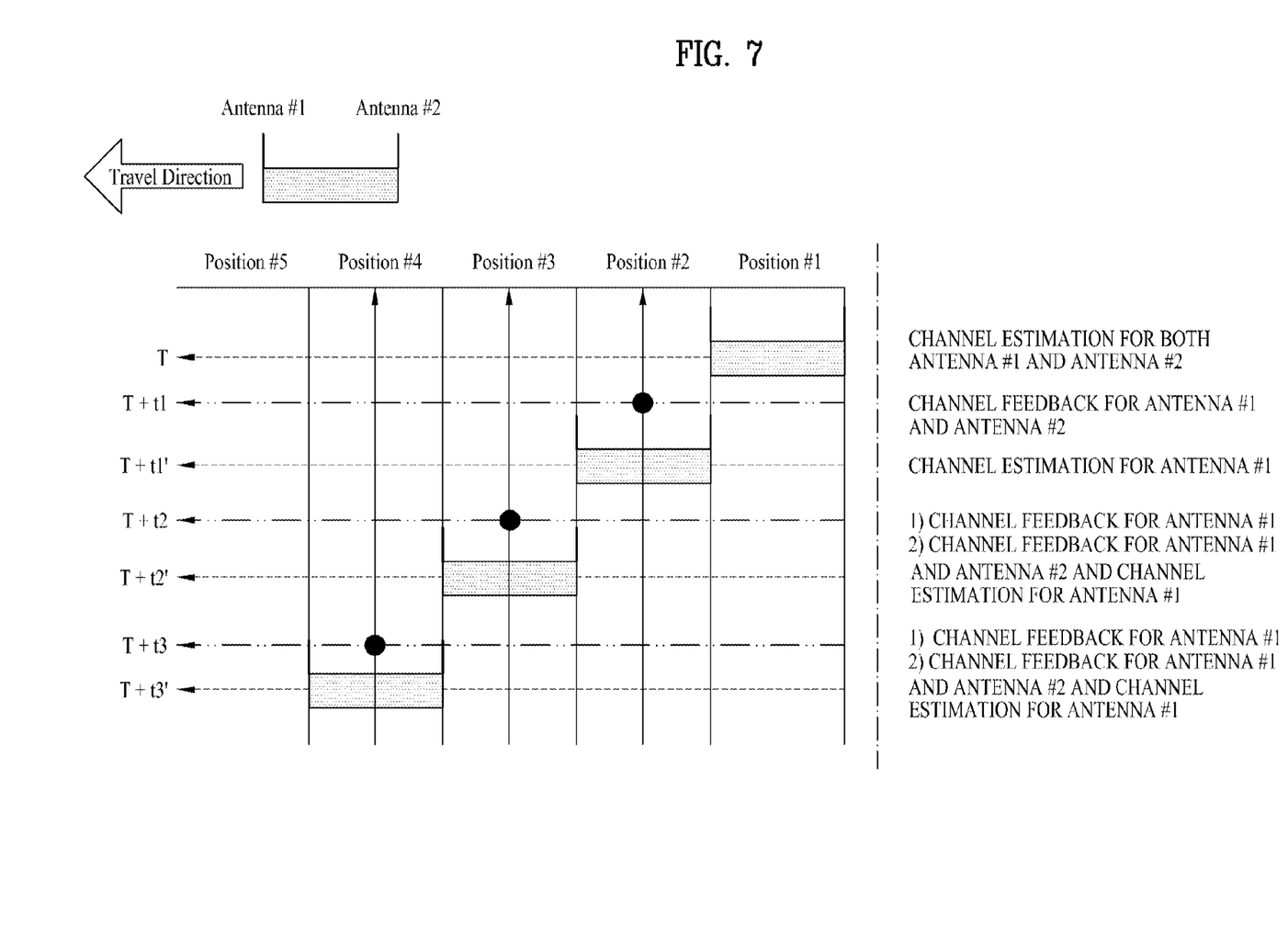
FIG. 7 is a diagram showing an example of reusing channel information of antennas of a UE in an environment in which a time-invariant channel is assumed at a specific position.

FIG. 7 is a diagram showing an example of reusing channel information of a plurality of antennas of a UE in an environment in which a time-invariant channel is assumed at a specific position.

As shown in FIG. 7, assume that a UE has two antennas, performs channel estimation at first to fourth positions and feeds channel information back to a BS at second and third positions. The UE performs channel estimation with respect to both antennas at a time T at the first position (initial start position) and feeds channel estimation information back to the BS at the second position or at a time T+t1. The UE performs channel estimation with respect to the first antenna part at the second position at a time t+t1' and uses information about the first antenna measured at a previous time as information about the second antenna part. In this case, assume that the first and second antenna parts of the UE of the UE are not correlated with each other. The UE may feed the channel information of the first antenna part estimated at T+t2 back to the BS. Alternatively, the channel information estimated with respect to the first antenna part and the second antenna part may be fed back to the BS. This procedure may be repeated within a predetermined valid time. If the valid time has elapsed, the UE may perform channel estimation again with respect to all antennas of the UE. In addition, the UE may perform channel estimation with respect to all antennas of the UE by a command of the BS or a network.

If a channel feedback period is significantly greater than a channel estimation period, the UE may perform channel feedback of recently measured or updated channel information including estimated information and stored information.

Figure 8:
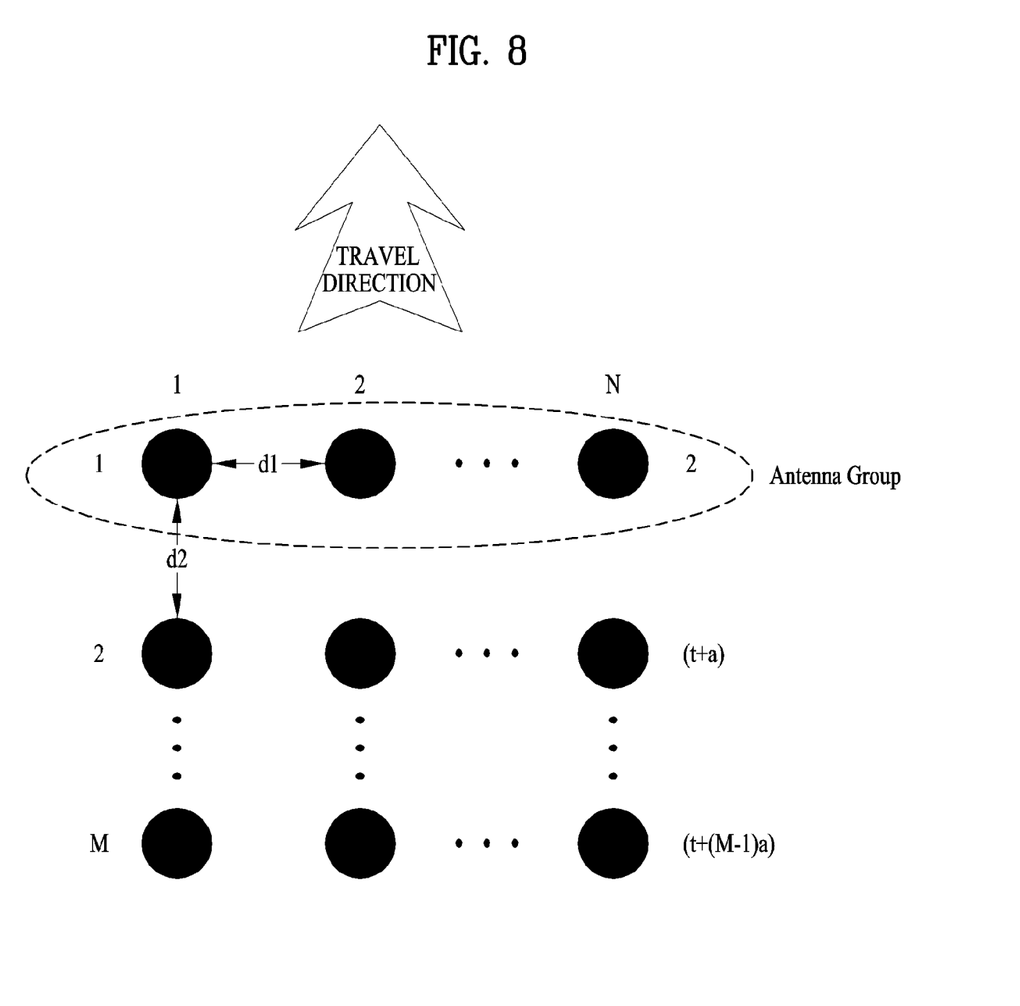
FIG. 8 is a diagram showing a multi-antenna configuration which reuses route prediction based channel information.

FIG. 8 is a diagram showing a multi-antenna configuration which reuses route prediction based channel information.

That is, a UE and a BS may apply channel information measured by an antenna or antenna group (antenna part) for first receiving a signal in a time domain at a specific position instead of channel information directly measured and estimated by an antenna or an antenna group in a next time domain at the specific position.

At this time, channel information estimated with respect to reference antennas, that is, target antennas directly subjected to channel estimation, preferably has the same antenna configuration. As shown in FIG. 7, in a UE having N*M multiple antennas, antennas first subjected to channel estimation in the time domain are N antennas (first antenna group or first antenna part) located at a first row and are separated by a distance d1. These N antennas become reference antennas. That is, in this case, in M antenna groups composed of N antennas, the distance d1 between antennas in the antenna group and the distance d2 between the antenna groups may not be equal. However, in order to minimize performance deterioration due to channel reuse, the distance d2 between the antenna groups is preferably constant and the distance d2 should be equal to a time interval for feedback of channel estimation information (e.g., CSI feedback) after performing direct channel estimation or direct use at the UE (e.g., the UE directly decides an uplink transmission method).

Additionally, the antenna group is not necessarily divided in the time domain. Antennas which are located in the same time domain, have different antenna configurations and are located at a distance different from that of the other antennas may be treated as different antenna groups. For example, if one antenna group is composed of S antennas and T antennas among N antennas have different performances, an antenna group composed of T antennas and an antenna group composed of N-T antennas may be separately treated.

In addition, if the distance d2 between the antenna groups is sufficiently large, channel information estimated for the reference antenna group may be no longer valid. This is because, if the antenna arrives at the position of the reference antenna group after a predetermined time, the channel is likely to be changed during the predetermined time. In this case, an arbitrary antenna group of all antenna groups may become a reference antenna group.

Restrictive channel estimation and/or restrictive channel feedback for some antennas or antenna groups of the UE may begin by the BS and the network or may be defined with respect to specific UE.

Embodiment 2-2

Reuse of Channel Measurement Information of an Antenna at Another UE Antenna

According to another embodiment of the present invention, the BS may determine channel statuses of a specific UE and another UE using channel information acquired via the specific UE and determine a transmission and reception scheme.

When considering an environment in which a plurality of UEs moving on a fixed or predictable route and having the same HW performance exists, a channel environment between a BS and UEs at the same position has main environmental change factors such as vehicle movement in the vicinity of the UEs and movement speeds of the UEs. That is, if channel change due to vehicle movement in the vicinity of the UEs is stably within a predetermined range and the movement speeds of the UEs are similar within a predetermined range, it may be determined that the channel statuses between the UEs and the BS at the same position are equal. In this case, the BS may estimate that the channel status of a specific UE (first UE) acquired via measurement and feedback is equal to the channel status of another UE (second UE) having the same HW performance at the same position and determine and transmit transmission and reception parameters and schemes of the UEs using the channel information acquired by the BS with respect to the UEs to be moved to the position where the reported channel information is measured.

Figure 9:
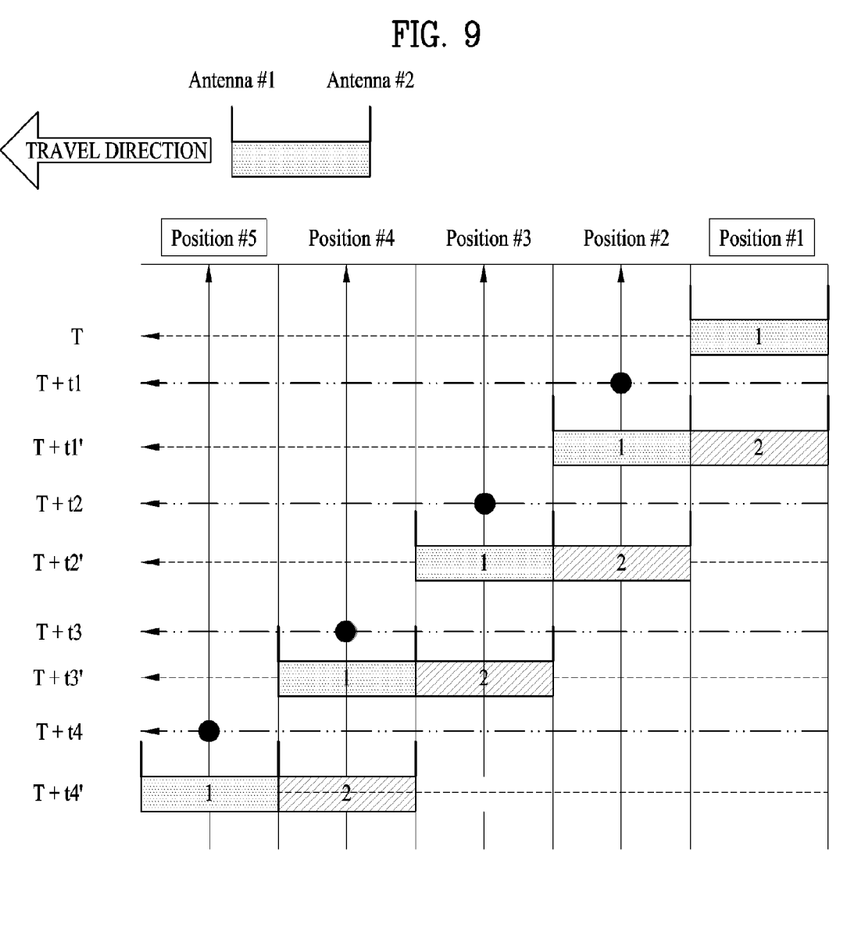
FIG. 9 is a diagram showing an example in which a base station and a UE perform transmission and reception using channel information estimated by another UE.

FIG. 9 is a diagram showing an example in which a BS and a UE perform transmission and reception using channel information estimated by another UE.

As shown in FIG. 9, assume that a first UE and a second UE move at the same speed on the same route. The first UE performs channel estimation at a first position (time T) and feedbacks information to a BS (time T+t1). However, the second UE does not perform channel estimation at the first position and uses channel information estimated and fed back by the first UE and transmitted by the BS.

The BS may notify UEs, which use the channel information of another UE, that channel estimation is not necessary or is restricted. Accordingly, the BS may not allocate a feedback channel or may allocate restricted channel to UEs, which use the channel information of another UE.

This process is repeated within a predetermined valid time. When the valid time has elapsed, the UEs, which use the channel information of another UE, directly performs channel estimation. Even when the predetermined valid time has not elapsed, the UE may directly perform channel estimation by a command of the BS or the network.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention are applicable to signal transmission and reception of a UE moving on a fixed route.

The invention claimed is:

1. A method of transmitting a signal from a base station in a multi-input multi-output (MIMO) wireless communication system, the method comprising:
   determining a transmission and reception scheme based on channel information previously measured at a specific position from a first user equipment (UE);
   checking whether a second UE moves to the specific position; and
   transmitting, to the second UE moving to the specific position, the transmission and reception scheme determined based on the channel information previously measured at the specific position from the first UE or the channel information previously measured at the specific position from the first UE, when the second UE moves to the specific position.

2. The method according to claim 1, wherein the channel information is applied to the second UE moving on a fixed route.

3. The method according to claim 1, wherein the channel information includes at least one or more of received signal strength indicator (RSSI), received signal received quality (RSRQ), received signal received power (RSRP), channel quality indicator (CQI), precoding vector index (PVI), precoding matrix indicator (PMI) and rank indicator (RI) information.

4. The method according to claim 1, wherein the channel information is divided and stored according to an antenna configuration of the second UE.

5. The method according to claim 1, wherein the channel information is divided and stored according to a movement speed of the second UE.

6. The method according to claim 1, wherein the channel information is divided and stored according to a weather condition of the specific position.

7. The method according to claim 1, wherein:
the channel information is stored in a database of the base station, and
the channel information stored in the database is updated at a predetermined time interval.

8. The method according to claim 1, wherein the determining the transmission and reception scheme includes determining a modulation type according to a movement speed of the second UE.

9. The method according to claim 1, wherein the checking whether the second UE moves to the specific position includes computing and checking a position, movement direction and movement speed of the second UE.

10. The method according to claim 1, wherein the first UE and the second UE are the same.

11. A method of receiving a signal at a first user equipment (UE) in a multi-input multi-output (MIMO) wireless communication system, the method comprising:
receiving channel information related to a specific position from a base station;
performing channel estimation at the specific position; and
determining a transmission and reception scheme at the specific position based on the received channel information and a result of the performed channel estimation,
wherein the channel information corresponds to information previously measured for a second UE, which is located at the specific position before the first UE.

12. The method according to claim 11, further comprising:
comparing the received channel information and channel estimation information; and
feeding the channel estimation information back to the base station if a difference between the received channel information and the channel estimation information is outside a predetermined error range.

13. The method according to claim 11, further comprising:
comparing the received channel information and channel estimation information; and
feeding information indicating that the received channel information is valid back to the base station if a difference between the received channel information and the channel estimation information is within a predetermined error range.

14. A base station apparatus in a multi-input multi-output wireless communication system, the base station apparatus comprising:
a receiver configured to receive movement information of a first user equipment (UE);
a transmitter configured to transmit, to the first UE moving to a specific position, a transmission and reception scheme determined at a specific position and channel information previously measured at the specific position from a second UE, if the first UE moves to the specific position; and
a processor operably coupled to the receiver and the transmitter,
wherein the processor is configured to:
determine whether the first UE moves to the specific position, and
determine a transmission and reception scheme based on the channel information previously measured at the specific position from the second UE.

* * * * *